United States Patent [19]

Ziebol

[11] Patent Number: 5,463,704
[45] Date of Patent: Oct. 31, 1995

[54] FIBER OPTIC SWITCH

[75] Inventor: Robert J. Ziebol, Blaine, Minn.

[73] Assignee: ADC Telecommunications, Inc., Minneapolis, Minn.

[21] Appl. No.: 243,192

[22] Filed: May 16, 1994

[51] Int. Cl.[6] ................................................ G02B 6/35
[52] U.S. Cl. ........................... 385/22; 385/16; 385/24; 385/25
[58] Field of Search ........................... 385/22, 24, 25, 385/26, 16, 17

[56] References Cited

U.S. PATENT DOCUMENTS

| | | | |
|---|---|---|---|
| 4,033,669 | 6/1977 | Hanson | 385/16 X |
| 4,088,387 | 5/1978 | Lewis | 385/16 X |
| 4,189,206 | 2/1980 | Terai et al. | 385/16 X |
| 4,193,662 | 3/1980 | Hara | 385/16 X |
| 4,204,744 | 5/1980 | Wittman | 385/16 X |
| 4,208,094 | 6/1980 | Tomlinson, III et al. | 385/16 X |
| 4,220,396 | 9/1980 | Antell | 385/16 X |
| 4,223,978 | 9/1980 | Kummer et al. | 385/16 X |
| 4,229,068 | 10/1980 | Hodge et al. | 385/16 X |
| 4,239,330 | 12/1980 | Ashkin et al. | 385/22 |
| 4,239,331 | 12/1980 | Aoyama | 385/16 X |
| 4,245,885 | 1/1981 | Hodge | 385/16 X |
| 4,245,886 | 1/1981 | Kolodzey et al. | 385/16 X |
| 4,261,638 | 4/1981 | Wagner | 385/16 X |
| 4,265,513 | 5/1981 | Matsushita et al. | 385/16 X |
| 4,303,302 | 12/1981 | Ramsey et al. | 385/16 X |
| 4,303,303 | 12/1981 | Aoyama | 385/16 X |
| 4,304,460 | 12/1981 | Tanaka et al. | 385/16 X |
| 4,318,587 | 3/1982 | Grassl | 385/16 X |
| 4,322,126 | 3/1982 | Minowa et al. | 385/16 X |
| 4,337,995 | 7/1982 | Tanaka et al. | 385/16 X |
| 4,378,144 | 3/1983 | Duck et al. | 385/16 X |
| 4,401,365 | 8/1983 | Mizokawa et al. | 385/16 X |
| 4,407,562 | 10/1983 | Young | 385/16 X |
| 4,410,929 | 10/1983 | Feinbloom et al. | 385/16 X |
| 4,415,228 | 11/1983 | Stanley | 385/16 X |
| 4,415,229 | 11/1983 | McCollough | 385/16 X |
| 4,441,785 | 4/1984 | Petrozello | 385/16 X |
| 4,445,752 | 5/1984 | Faber et al. | 385/16 X |
| 4,452,507 | 6/1984 | Winzer | 385/16 X |
| 4,484,793 | 11/1984 | Laude | 385/16 X |
| 4,498,730 | 2/1985 | Tanaka et al. | 385/16 X |
| 4,512,627 | 4/1985 | Archer et al. | 385/16 X |
| 4,516,837 | 5/1985 | Sosef et al. | 385/16 X |
| 4,557,555 | 12/1985 | Stoerk et al. | 385/16 X |
| 4,580,873 | 4/1986 | Levinson | 385/16 X |
| 4,582,391 | 4/1986 | Legrand | 385/16 X |
| 4,585,301 | 4/1986 | Bialkowski | 385/16 X |
| 4,589,726 | 5/1986 | Buhrer | 385/16 X |
| 4,607,910 | 8/1986 | Thurenius | 385/16 X |
| 4,610,504 | 9/1986 | Thurenius et al. | 385/16 X |
| 4,611,885 | 9/1986 | Biorat | 385/16 X |
| 4,650,277 | 3/1987 | Husher et al. | 385/16 X |
| 4,653,849 | 3/1987 | Boirat et al. | 385/16 X |
| 4,653,850 | 3/1987 | Boirat et al. | 385/16 X |
| 4,657,339 | 4/1987 | Fick | 385/16 X |
| 4,681,397 | 7/1987 | Bhatt | 385/16 X |
| 4,699,457 | 10/1987 | Goodman | 385/16 X |
| 4,715,673 | 12/1987 | Noro et al. | 385/16 X |
| 4,753,501 | 6/1988 | Battle | 385/16 X |
| 4,834,488 | 5/1989 | Lee | 385/16 X |
| 4,896,935 | 1/1990 | Lee | 385/16 X |
| 5,031,986 | 7/1991 | Mori | 385/25 |
| 5,031,990 | 7/1991 | Mori | 385/25 |
| 5,037,176 | 8/1991 | Roberts et al. | 385/16 |
| 5,317,659 | 5/1994 | Lee | 385/22 |

FOREIGN PATENT DOCUMENTS 2060930A  5/1981  United Kingdom ............ G02B 7/26

OTHER PUBLICATIONS

Siecor Corp., publication date 1986, "Siecor Electro–Optic Products" (no month).

Primary Examiner—Brian Healy
Attorney, Agent, or Firm—Merchant, Gould, Smith, Edell, Welter & Schmidt

[57] ABSTRACT

A rotary fiber optic switch switches a first optical fiber among a plurality of second optical fibers. The switch is calibrated with a control mechanism such that movement of the rotated fiber to a prescribed position achieves a maximum power transmission between the first fibers and an opposing one of said plurality.

6 Claims, 2 Drawing Sheets

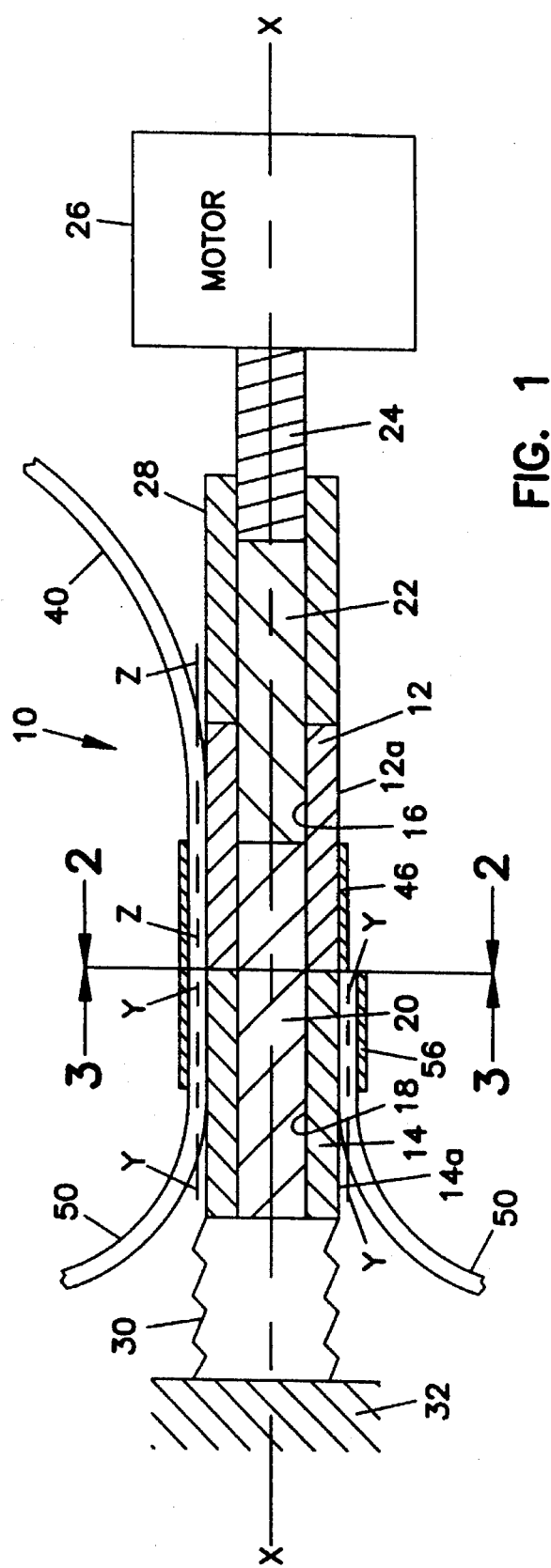
FIG. 1
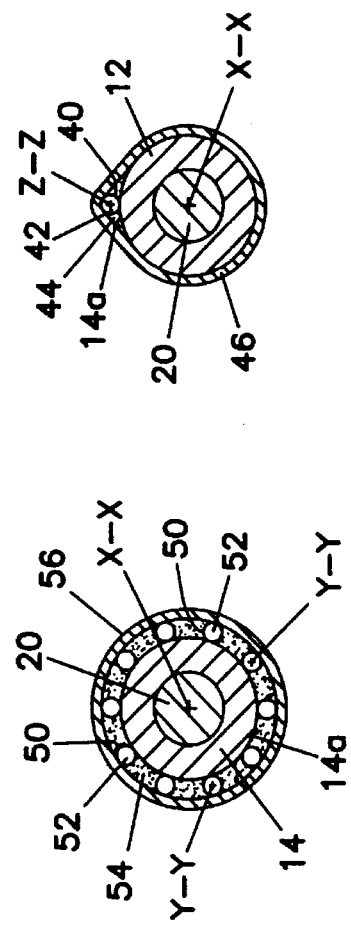
FIG. 2
FIG. 3

FIBER OPTIC SWITCH

BACKGROUND OF THE INVENTION

1. Field of the Invention

This invention pertains to the telecommunications industry where data and voice signals are transmitted optically over fibers. More particularly, this invention pertains to a switch for use in a fiber optic transmission system.

2. Description of the Prior Art

In fiber optic data and voice transmission systems, signals are transmitted in a form of light over optical fibers. The prior art has developed numerous products for interfacing optical fibers. For example, such products will include optical fiber connectors and the like.

From time to time, it is desirable to decouple two optical fibers and to redirect one of the previously coupled fibers to a different optical fiber. To accomplish such a switching function, fiber optic switches have been developed.

Fiber optic switches may operate by moving fibers transversely relative to one another (e.g., U.S. Pat. No. 4,204,744). Also, there is a variety of fiber optic switches which achieves the switching operation by rotating fibers relative to one another about a common axis of rotation.

A common feature of prior art rotary fiber optic switches is the need to precisely position fibers in a circumferential spacing about the axis of rotation. For example, in U.S. Pat. No. 4,946,247, the fibers are retained within a bore axially formed through a ferrule. The fibers are disposed in a closely packed array with the fibers abutting one another as well as abutting the internal cylindrical surface of the ferrule. As a result of such construction, the central core of each of the fibers in the array is equally spaced from one another as well as being held in a fixed spacing from the axis of rotation of the fiber. Accordingly, by rotating one of the fiber arrays relative to the other by an angular displacement equal to the angular displacement of the fibers within the array, optic coupling between opposing fibers is maintained. If, for any reason, any of the fibers were to be unevenly circumferentially spaced about the axis of rotation, transmission losses would occur since opposing fibers and would not be in accurate axial alignment.

U.S. Pat. No. 4,204,744 teaches an alternative means for maintaining fibers in a precise circumferential array. In U.S. Pat. No. 4,204,744, optical fibers are positioned on the external cylindrical surface of a rod. Spacing rods are provided on the external surface in closely abutting relation. The optical fibers are retained within the interstitial spaces defined between the supporting rods and the central rod.

As mentioned, in the prior art rotary fiber optic switches, precisely controlled circumferential spacing is necessary in order to ensure precise axially alignment of opposing fibers of the switch. If such precise axial alignment is not attained, undesirable transmission losses occur. However, controlling precise circumferential spacing can be costly and difficult to achieve. It is an object of the present invention to provide a rotary fiber optic switch which does not rely upon precise circumferential spacing of fibers.

SUMMARY OF THE INVENTION

According to a preferred embodiment of the present invention, a fiber optic switch is provided for switching an optical coupling between at least a first optical fiber and a plurality of second optical fibers. The first optical fiber is mounted with its terminal end generally parallel and spaced from an axis of rotation. The plurality of second optical fibers are mounted with their terminal ends being general parallel and spaced from the axis of rotation by the same distance as the first optical fiber. The plurality of second optical fibers and the first optical fiber are relatively rotatable about the axis of rotation. Also, the plurality of second optical fibers are positioned for individual ones to oppose and optically couple with the terminal end of the first optical fiber as a result of relative rotation between the first optical fiber and the plurality of second optical fibers. A motor is provided for urging the first optical fiber and the second plurality to rotate relative to one another. Each one of the second optical fibers has an optimum position of rotation relative to the first optical fiber. At the optimum position of rotation, a power of a signal transmission between the first optical fiber and the second optical fiber is maximized. The motor includes a mechanism for rotating the second optical fibers relative to the first optical fibers to any selected one of the optimum positions.

BRIEF DESCRIPTION OF THE DRAWINGS

FIG. 1 is a side sectional view showing a switching component of an optical fiber switch according to the present invention;

FIG. 2 is a view taken along line 2—2 of FIG. 1;

FIG. 3 is a view taken along line 3—3 of FIG. 1; and

DESCRIPTION OF THE PREFERRED EMBODIMENT

Figure 4:
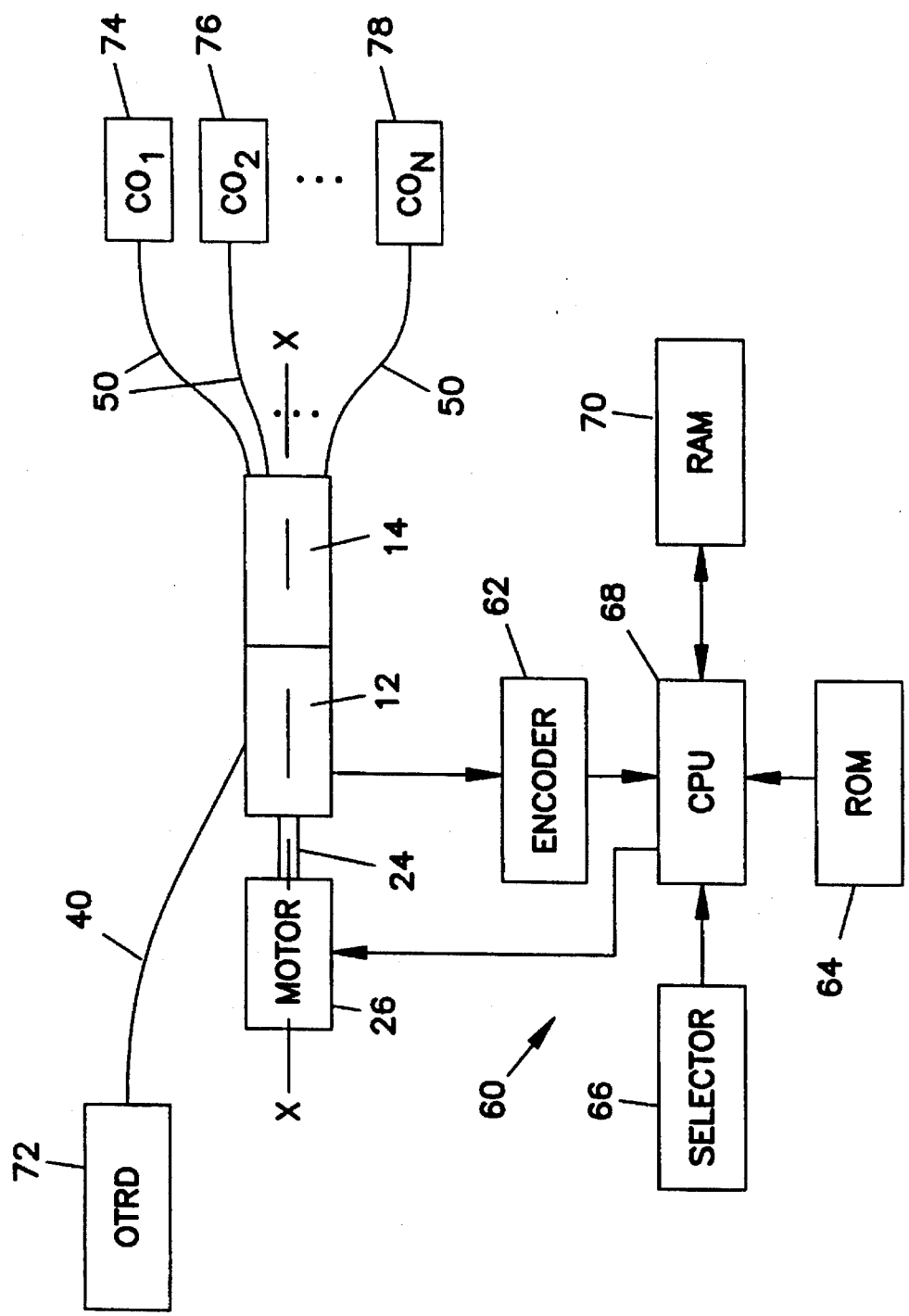
FIG. 4 is a schematic representation of the fiber optic switch according to the present invention including the switching component of FIG. 1 together with a control mechanism and in use in a fiber optic signal transmission system.

Referring now to the several drawing figures in which identical elements are numbered identically throughout, a description of the preferred embodiment will now be provided.

With initial reference to FIG. 1, a switching component 10 is shown. The switching component 10 includes first and second hollow cylindrical tubes 12, 14, respectively. Preferably, each of tubes 12, 14 is formed of rigid ceramic. Extending axially through the cylindrical tubes 12, 14 are first and second cylindrical bores 16, 18. A ceramic cylindrical alignment pin 20 extends completely through bore 18 and partially through bore 16. In the preferred embodiment, alignment pin 20 is fixed to second tube 14 by means of epoxy or other adhesive to adhere the external cylindrical surface of pin 20 to the internal cylindrical surface of tube 14. Accordingly, pin 20 may not rotate relative to tube 14.

Unlike tube 14, tube 12 is not adhered to pin 20. Instead tube 12 is freely rotatable on tube 20 to rotate relatively thereto about an axis of rotation X—X. Preferably, pin 20 closely matches the internal diameter of bore 16 such that tube 12 rotates relative to tube 14 but maintains axial alignment relative thereto such that the terminal ends of the tubes 12, 14 stay in closely aligned abutting relation throughout the relative rotation of tubes 14, 12.

A drive pin 22 is inserted within bore 16 and fixed to tube 12 by means of glue or the like. The drive pin 22 is connected to the shaft 24 of a motor 26 by means of a coupling 28. With the construction thus far described, as motor shaft 24 rotates about axis X—X, the coupling 28 transmits the rotary action to the drive pin 22 which in turn transmits the rotary action to first tube 12 urging it to rotate on pin 20 about axis X—X. Tube 12 is freely axially slidable on alignment pin 20. To prevent relative axial movement of tubes 12, 14, a bellows 30 is provided secured to an axial end of tube 14 and further secured to a stationary support 32. Accordingly, as tube 12 rotates, tube 14 may not rotate since bellows 30 does not accommodate axial rotation of tube 14 relative to fixed support 32. Any relative axial movement of tube 14 necessary to accommodate manufacturing tolerances is accommodated by bellows 30.

A first optical fiber 40 is secured to the outer cylindrical surface 12a of tube 12. Fiber 40 terminates at a terminal face 42. Optical fiber 40 is secured to tube 12 with the axis Z—Z of fiber 40 parallel and spaced from axis X—X by a fixed distance.

Preferably, the terminal face 42 is in planner alignment with the end axial face of tube 12. The fiber 40 is secured to the tube 12 in the position thus described by means of epoxy adhesive 44. While the epoxy adhesive 44 is setting, fiber 40 may be retained in its desired alignment by means of an elastomeric band 46 (such as a shrink-wrap or the like).

A plurality of second optical fibers 50 are secured to tube 14. Each of the second optical fibers terminates at a terminal face 52.

The fibers 50 are secured to the outer cylindrical surface of tube 14 with the axis Y—Y of each of the fibers 50 maintained in parallel spaced alignment to the axis X—X. Each of the fibers 50 at the terminal ends 52 is spaced from the axis X—X by a fixed distance equal to the spacing of axis Z—Z from axis X—X. Further, each of the fibers terminal faces 52 are preferably maintained in generally coplaner alignment with the end face of tube 14.

To retain the fibers 50 in the position thus described, each of the fibers 50 is secured to the outer cylindrical surface of tube 14 by means of epoxy adhesive 54. To retain the fibers 50 in place while the adhesive 54 cures, an elastomeric band 56 surrounds each of the fibers 50 urging them against the outer surface 14a of tube 14.

With the benefit of the foregoing, fibers 40 and 50 are retained in identical spacing from the axis of rotation X—X. The precision of the spacing is accomplished by precise control of the diameters of the ceramic tubes 12, 14 as well as precise positioning of the bores 16, 18 held in alignment by pin 20. Accordingly, as tube 12 is rotated about axis X—X, fiber 40 alternately couples and decouples from each of the fibers 50 secured to tube 14.

It will be noted that in the embodiment thus described, no provision has been made for maintaining precise circumferential spacing of fibers 50 on surface 14a. Instead each of the fibers 50 may be placed on surface 14a without regard to the axially spacing of the others of the fibers 50 and, hence, without the expense or difficulties associated with maintaining such precise circumferential spacing.

Optical coupling of fiber 40 with individual ones of fibers 50 is accomplished by means of a control mechanism 60 schematically shown in FIG. 4. The control mechanism 60 includes an optical encoder 62. It will be appreciated that optical encoders 62 are commercially available items. Such encoders 62 detect incremental rotation and generate a signal in the form of a pulse in response to each detected incremental rotation.

In the preferred embodiment, an optical encoder 62 is coupled through commercially known means to tube 12 such that as tube 12 rotates, the encoder generates pulsed signals in response to the rotation. In commercially available encoders 62, such encoders may generate 100 pulses for each degree of angular rotation about the axis X—X.

The control mechanism further includes a memory 64 (shown as a read only memory) for storing information indicating the optimum positions of each of fibers 50. By optimum positions, it will be understood that as fiber 40 passes each of fibers 50, the amount of optical signal power transmission between each of the fibers 50 to fiber 40 varies significantly from no transmission (representing complete decoupling of each fibers 40) to a maximum power transmission (corresponding with an optimum axial alignment of each of fibers 50 with fiber 40).

The optimum position for each of the fibers 50 can be measured and described as an angular position with respect to an arbitrarily selected start point. For example, with the tubes 12, 14 at a rest position, that position can be arbitrarily identified as the zero position. The fibers 50, 40 can be rotated relative to one another until fiber 40 optically couples with a fiber 50 at its optimal position. That position can be identified and recorded as a fixed number of degrees from the zero position. Further rotation of tube 14 relative to tube 12 moves fiber 40 to the next fiber 50. When its optimal position is attained, the position can be measured and reflected as degrees of rotation from the rest position. Subsequently, all fibers 50 can be identified as being within a known number of degrees, clockwise or counterclockwise, from the neutral or zero position. After all of the fibers 50 have been so calibrated (i.e., their optimum position has been identified as a known radial displacement from an arbitrarily selected rest position) the optimal positions can be stored in memory 64.

The control mechanism 60 further includes a selector 66 to permit an operator to identify which of the fibers 50 is to be coupled with fiber 40. For example, fibers 50 can be simply labeled fibers from, for example, cables 74, 76, 78, etc. An operator can operate selector 66 to input the number of the fiber to coupled with fiber 40. The selector can be in the form of a dial, keyboard, or the like. Further, the control mechanism 60 includes a central processing unit 68 positioned to receive pulses from encoder 62, inputs from selector 66 and access to the memory 64. The controller 68 receives the pulses from encoder 62 and counts the total number of pulses as tube 12 (and, hence, fiber 40) are rotated. The controller 68 further compares the total number of pulses (representing total amount of rotation) to the starting position of tube 12 prior to its rotation to determine if the optimum position of the desired fiber has been attained. At the desired position, rotation is stopped. A random access memory 70 is provided to permit the central processing unit 68 to store and retrieve from an address location a number identifying the start position of tube 12.

From the foregoing, the reader will appreciate that software for receiving the inputs from the encoder 62, selector 66 and interfacing with memory 64, 70 is well within the skill of the art as well as preparing such software to count the number of pulses from encoder 62, to add the number of pulses to the known starting position of tube 12 and to compare the total to the desired position of the desired fiber 50 stored in memory 64.

As a result of the above construction, the particular spacing of the fibers 50 about the circumference of tube 12 is not critical. Also, a large number of fibers can be contained on tube 12. For example, with the tube 12 having an outside diameter of 3.2 millimeters and fibers 40, 50 having outside diameters of 0.125 millimeters, about seventy-two fibers 50 can be retained on the exterior of the tube 14. Accordingly, fiber 40 may be selectively coupled with any one of 72 fibers.

To permit accurate positioning at the optical position, motor 26 must move tube 12 in controlled amounts. However, DC motors are commercially available which can rotate within accuracies of 1/100 degree. Accordingly, the axis Z—Z of fiber 40 and the axes Y—Y fibers 50 can be very accurately aligned.

The present invention is particularly useful for use with an optical time domain reflectometer (OTDR) 72. An OTDR is an expensive piece of hardware which is used to trace a light signal through a cable to determine if the cable has been cut or is otherwise damaged.

Cables coming from central office locations typically include a bundle of fibers having at least 1 inactive fiber. Cables 74, 76, 78 are shown in FIG. 4 in schematic format. The inactive fibers are shown as fibers 50 extending from cables 74, 76, 78 and secured to tube 14. Accordingly, by rotating tube 12, fiber 40 may be optically coupled with any one of the inactive fibers 50 of the central office cables 74, 76, 78. As a result, only one expensive OTDR 72 need be used to test up to N central office fibers. Where seventy-two fibers are deposited on tube 14, a single OTDR 72 can test seventy-two different central office cables resulting in a significant equipment savings.

In the foregoing description, a single fiber 40 was contained on tube 12. It will be appreciated that tube 12 may contain more than one fiber 40 such that two or more couplings can occur with each rotation of tube 12 relative to tube 14. However, if multiple fibers 40 are retained on tube 12, then the circumferential spacing of fibers 50 as well as the fibers 40 on tube 12 becomes critical. In such an embodiment, fibers 50 should be positioned in abutting side by side relation or provided with spacers having the diameter of fibers 50 (or alternatively, whole fractional portions or multiples of the diameter of fibers 50).

From the foregoing description of the present invention it has been shown how the objects of the invention has been attained in a preferred manner. However, modifications and equivalents of the disclosed concepts such as those which readily occurred at one of ordinary skill in the art are intended to be included within the scope of the present invention.

What is claimed is:

1. A switch for switching optical coupling between at least a first optical fiber and a plurality of second optical fibers, said switch comprising:

a first optical fiber having a terminal end;

first means for mounting said first optical fiber with said terminal end generally parallel and spaced from an axis of rotation by a distance;

a plurality of second optical fibers each having a terminal end;

second means for mounting said plurality of second optical fibers with said terminal ends of said plurality generally parallel and spaced from said axis of rotation by said distance and with said plurality and said first optical fiber relatively rotatable about said axis, said plurality further positioned for said terminal ends of each of said plurality to individually oppose and optically couple with said terminal end of said first optical fiber as said plurality and said first optical fiber are rotated relative to one another about said axis of rotation;

motive power means for urging said first optical fiber and said plurality to rotate relative to one another about said axis;

each one of said plurality having an optimum position of rotation relative to said first optical fiber for a signal power transmission between said each one and said first optical fiber to be maximized at said optimum position;

said motive power means including control means for rotating said plurality relative to said first optical fiber to any selected one of said optimum position;

said control means include electronic storage means for storing a value associated with each of said optimum positions and detection means for determining when said motive power means has rotated said plurality to a desired one of said optimum positions.

2. A switch according to claim 1 wherein:

said first means includes a first generally cylindrical body with said first fiber secured to an outer cylindrical surface of said first body and with said first cylindrical body having an axis generally colinearly aligned with said axis of rotation;

said second means includes a second generally cylindrical body with each one of said plurality secured to an outer cylindrical surface of said second body and with said second cylindrical body having an axis colinearly aligned with said axis of rotation; and said first and second bodies rotatable relative to one another about said axis of rotation.

3. A switch according to claim 2 wherein:

each of said first and second bodies is provided with axially extending first and second, respectively, bores extending at least partially therethrough;

an alignment pin sized to be received within each of said first and second bores with at least one of said first and second bodies rotatable on said pin.

4. A switch according to claim 2 wherein at least one of said first and second bodies is fixed from rotation about said axis of rotation and the other of said first and second bodies is rotatable about said axis of rotation.

5. A switch according to claim 4 wherein said second body is fixed from rotation about said axis of rotation and said first body is rotatable about said axis of rotation.

6. A switch for switching optical coupling between at least a first optical fiber and a plurality of second optical fibers, said switch comprising:

A first optical fiber having a terminal end;

first means for mounting said first optical fiber with said terminal end generally parallel and spaced from an axis of rotation by a distance;

a plurality of second optical fibers each having a terminal end;

second means for mounting said plurality of second optical fibers with said terminal ends of said plurality generally parallel and spaced from said axis of rotation by said distance and with said plurality and said first optical fiber relatively rotatable about said axis, said plurality further positioned for said terminal ends of each of said plurality to individual by oppose and optically couple with said terminal end of said first optical fiber as said plurality and said first optical fiber are rotated relative to one another about said axis of rotation;

motive power means for urging said first optical fiber and said plurality to rotate relative to one another about said axis;

each one of said plurality having an optimum position of rotation relative to said first optical fiber for a signal power transmission between said each one and said first optical fiber to be maximized at said optimum position;

said motive power means including means for rotating said plurality relative to said first optical fiber to any selected one of said optimum positions;

detection means for detecting incremental relative rotation between said first fiber and said plurality about said axis of rotation and for generating a signal responsive to each detected incremental rotation;

memory means for storing information as to each of said optimum positions;

selection means for selecting a particular one of said optimum positions; and control means for receiving said signal and counting a total of said signals as said first fiber and said plurality are rotated relative to one another, said control means further including means for comparing said total to said particular one and operating said motive power means until said total corresponds to said particular one.

* * * * *

UNITED STATES PATENT AND TRADEMARK OFFICE
CERTIFICATE OF CORRECTION

PATENT NO. : 5,463,704

DATED : October 31, 1995

INVENTOR(S) : Robert J. Ziebol

It is certified that error appears in the above-identified patent and that said Letters Patent is hereby corrected as shown below:

Column 1, line 41, delete "and" after the word "fibers";

Column 1, line 52, "axially" should read --axial--;

Column 2, line 1, "general" should read -- generally--;

Column 2, line 60, "14,12" should read --12,14--;

Column 3, line 50, "axially" should read --axial--;

Column 4, line 34, insert --be-- after the word "to";

Column 5, line 4, "axes" should read --axis--;

Column 5, line 39, "at" should read --to--;

Column 6, line 12, "1" should read --6--; and

Column 6, line 57, "individual by oppose" should read --individually oppose--.

Signed and Sealed this

Twenty-first Day of May, 1996

Attest:

BRUCE LEHMAN

*Attesting Officer*     *Commissioner of Patents and Trademarks*